(12) United States Patent
Ouyang

(10) Patent No.: US 8,304,101 B2
(45) Date of Patent: Nov. 6, 2012

(54) BATTERY COVER LATCHING MECHANISM FOR PORTABLE ELECTRONIC DEVICE

(75) Inventor: Zhi-Bin Ouyang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 342 days.

(21) Appl. No.: 12/791,064

(22) Filed: Jun. 1, 2010

(65) Prior Publication Data

US 2011/0195292 A1 Aug. 11, 2011

(30) Foreign Application Priority Data

Feb. 6, 2010 (CN) .......................... 2010 1 0301292

(51) Int. Cl.
*H01M 2/10* (2006.01)

(52) U.S. Cl. .......................................... 429/100; 429/96
(58) Field of Classification Search ................... 429/100
See application file for complete search history.

(56) References Cited

U.S. PATENT DOCUMENTS

| 7,512,397 | B2 * | 3/2009 | Liu et al. ....................... 455/347 |
| 2010/0081045 | A1 * | 4/2010 | Li ................................. 429/100 |
| 2010/0279164 | A1 * | 11/2010 | Gao ............................. 429/100 |

* cited by examiner

*Primary Examiner* — John S Maples
(74) *Attorney, Agent, or Firm* — Altis Law Group, Inc.

(57) ABSTRACT

A battery cover latching structure comprises a housing, a cover, a button and a follower. The housing has a catch positioned thereon. The cover is mounted to housing. The button is rotatably mounted to the cover. The follower is slidably mounted to cover, the follower has a latch releasably latched with the catch. When the button is rotated relative to the cover, the button pushes the follower away from the catch to release the latch and the catch.

20 Claims, 6 Drawing Sheets

BATTERY COVER LATCHING MECHANISM FOR PORTABLE ELECTRONIC DEVICE

BACKGROUND

1. Technical Field

The disclosure generally relates to battery cover latching mechanisms, and particularly relates to battery cover latching mechanisms used in portable electronic devices.

2. Description of Related Art

Batteries are widely used in portable electronic devices, such as personal digital assistants (PDAs), cellular phones, etc. A typical latching structure is used to latch a battery cover to the electronic device and thus to secure the battery between the battery cover and the electronic device. However, a typical latching structure may be hard to unlatch for exposing the battery to remove the battery.

Therefore, there is a room for improvement within the art.

BRIEF DESCRIPTION OF THE DRAWINGS

Many aspects of the exemplary battery cover latching structure for portable electronic device can be better understood with reference to the following drawings. These drawings are not necessarily drawn to scale, the emphasis instead being placed upon clearly illustrating the principles of the exemplary battery cover latching structure and portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

For illustrative purposes, the device is an electronic device such as a radiotelephone. The radiotelephone described herein is a representation of the type of wireless communication device that may benefit from the present disclosure. However, it is to be understood that the present disclosure may be applied to any type of hand-held or portable device including, but not limited to, the following devices: cordless phones, paging devices, personal digital assistants, portable computers, pen-based or keyboard-based handheld devices, remote control units, portable media players that have wireless communication capability and the like. Accordingly, any reference herein to the radiotelephone should also be considered to apply equally to other portable wireless electronic devices.

Figure 1:
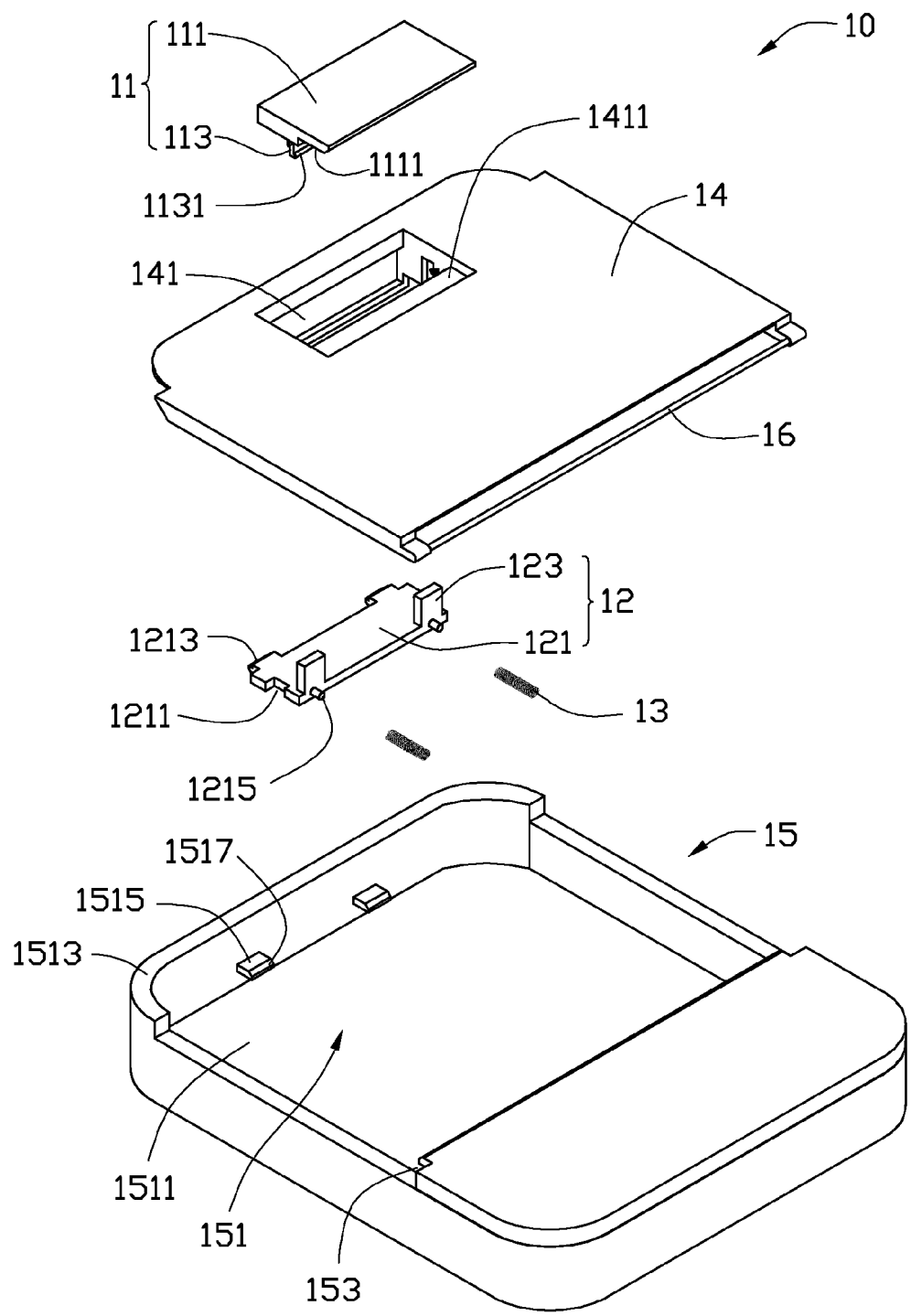
FIG. 1 is a schematic and exploded view of a portable electronic device with a battery cover latching mechanism according to an exemplary embodiment.
Figure 2:
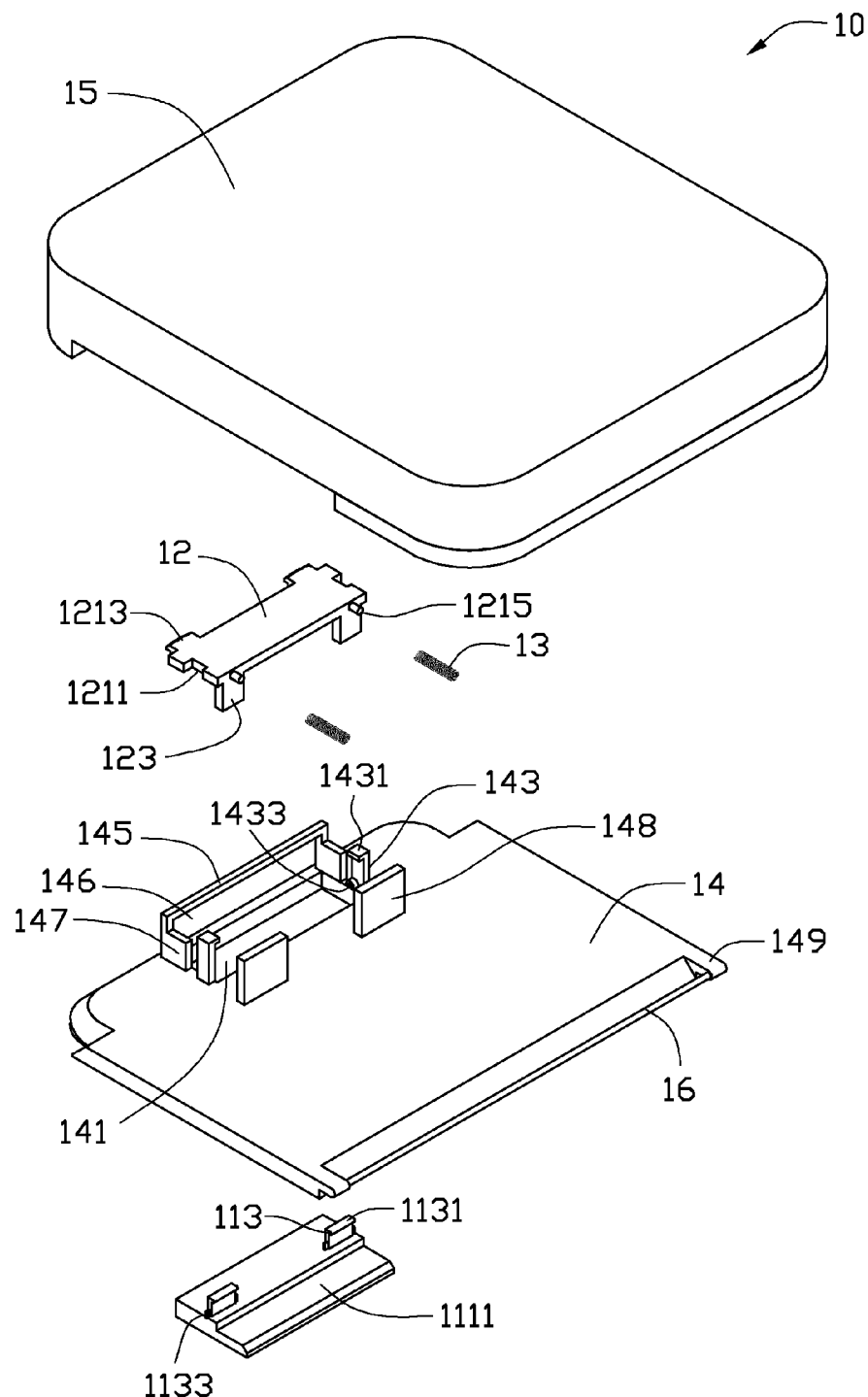
FIG. 2 is similar to FIG. 1, but showing another aspect.

An exemplary embodiment of an electronic device 10 incorporating a battery cover latching mechanism is shown in FIG. 1 and FIG. 2. The battery cover latching mechanism includes a button 11, a follower 12, at least one elastic members 13, a cover 14 and a housing 15 and a shaft 16. In this exemplary embodiment, the number of the elastic members 13 is two. The button 11, follower 12, and the elastic members 13 are all mounted to the cover 14. The cover 14 is rotatably mounted to the housing 15 by the shaft 16.

The button 11 includes a main body 111 and at least one resisting block 113. In this exemplary embodiment, the number of the resisting blocks 113 is equal to the number of elastic members 13, i.e., the number of the resisting blocks 113 is two. The main body 111 is of any shape, such as rectangular and includes a resisting slot 1111 recessed from an inner surface thereof. When the cover 14 is in a closed position shown in FIG. 5, the resisting slot 1111 mates with the cover 14 so as to prevent the button 11 from moving toward the cover 14. The resisting blocks 113 spacedly protrude from the inner surface of the main body 111. Each resisting block 113 is substantially rectangular in this embodiment. It is to be understood that other shapes may be used. Each resisting block 113 has a resisting portion 1131 extending from a distal end thereof for pushing the follower 12 when the button 11 is depressed toward the housing 15 shown in FIG. 6. The button 11 further includes two joints 1133 located on each of the resisting block 113, respectively. The cover 14 has two voids 1433 (See FIG. 2) corresponding to the joints 1133. The joints 1133 are rotatably mounted to the voids 1133 such that the button 11 can rotate relative to the cover 14.

The follower 12 includes a base 121 and a plurality of engaging portions 123 protruding from the base 121. In this embodiment, the number of the engaging portions 123 is two. The base 121 has two notches 1211 defined in opposite ends thereof for facilitating assembling the follower 12 to the cover 14. The base 121 has two latches 1213 positioned on one edge thereof and two posts 1215 positioned on another edge thereof opposite to the latches 1213. The latches 1213 are latched with the housing 15 when the cover 14 is in the closed position shown in FIG. 5, and the latches 1213 are unlatched with the housing 15 when the button 11 is pressed shown in FIG. 6. The posts 1215 are used to wrap the elastic members 13 thereon. The engaging portions 123 corresponds to and resist against the resisting portion 1131 of the button 11.

The elastic members 13 are coupled between the follower 12 and the cover 14. The elastic members 13 exert a force on the follower 12, causing the follower 12 to slide toward the housing 15 when the follower 12 is pressed toward the cover 14 under the rotation of the button 11. Each elastic member 13 may be an elastic resisting member (such as an expansion spring, a compression spring, or an elastic band). In this embodiment, each elastic member is an expansion spring having two ends respectively retained on a corresponding post 1215 of the follower 12 and a pole 1481 (see FIG. 5) of corresponding retaining block 148 of the cover 14.

The cover 14 has a receptacle 141 defined therethrough corresponding to the button 11. The receptacle 141 is sized and shaped to accommodate the main body 111 of the button 11. The cover 14 further has a mating portion 1411 located in the receptacle 141. When the button 11 is located in the receptacle 141, the mating portion 1411 occupies the resisting slot 1111 to prevent movement of the button 11 toward the cover 14 (see FIG. 5).

Figure 3:
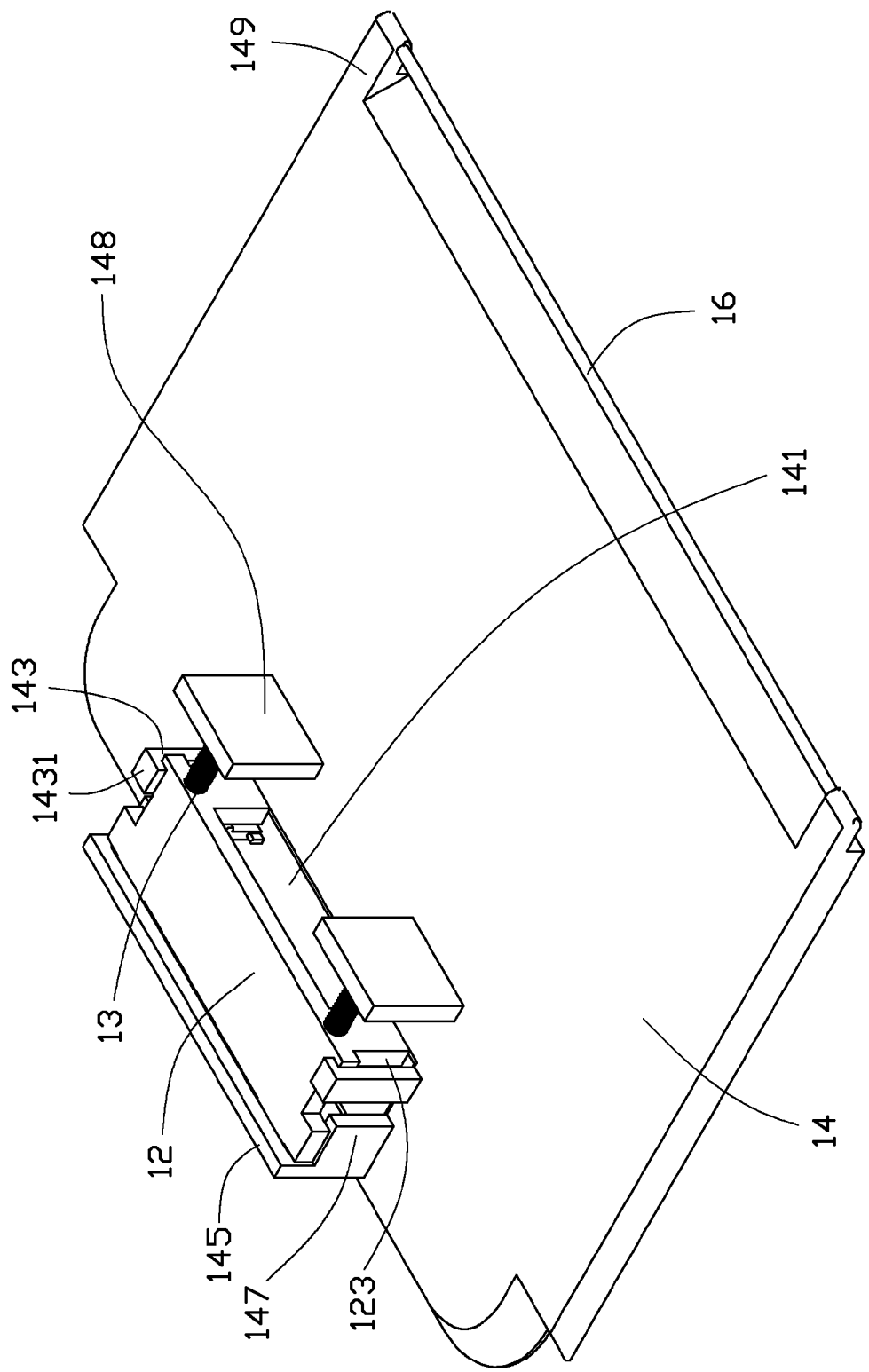
FIG. 3 is a schematic and partially enlarged view when a cover, a button and a follower assembled together.

Referring to FIG. 3, the cover 14 has a mounting portion (not labeled) for slidably mounting the follower 12 on the cover 14. The mounting portion, in this embodiment, includes two limiting blocks 143 protruding from an inner surface of the cover 14 and located near two ends of the receptacle 141, two supporting boards 147 protruding from an inner surface of the cover 14 and positioned respectively near the limiting blocks 143, a stopping member 145 connecting the supporting boards 147 and located on one side of the receptacle 141, and two retaining block 148 located on another side of the receptacle 141 opposite to the stopping member 145. Each limiting block 143 has a limiting portion 1431 distal therefrom corresponding to the notches 1211 of the follower 12. The limiting portions 1431 are slightly smaller than the notches 1211 such that the limiting portions 1431 can pass through the notches 1211. As a result, two ends of the base 121 of the follower 12 are limited between the limiting blocks 143 after the limiting portions 1431 pass through the notches 1211.

Figure 5:
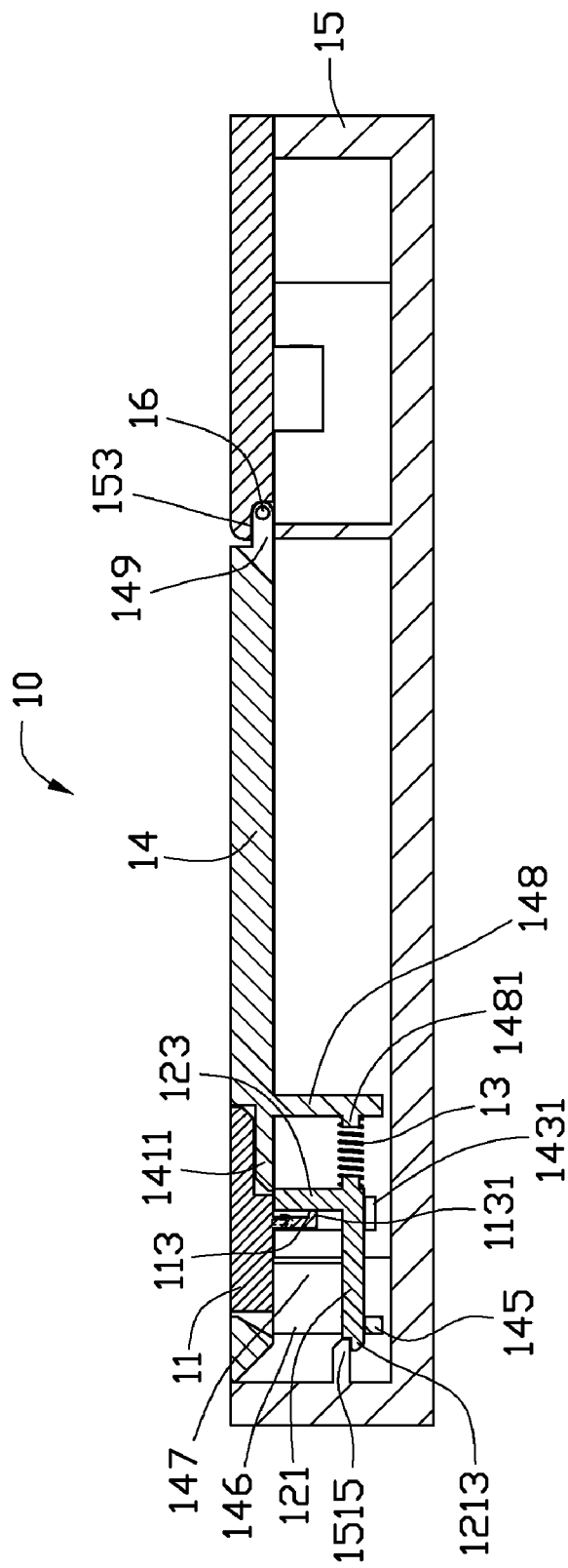
FIG. 5 is a cross-sectional view of the portable electronic device shown in FIG. 4.

Referring to FIG. 3, when the two ends of the base 121 of the follower 12 is limited between the limiting blocks 143, two opposite surfaces of the base 121 are held between the supporting boards 147 and limiting portions 1431. Additionally, the engaging portions 123 resist the cover 14 to assist the supporting boards 147 in supporting the base 121. Two opposite sides of the base 121 are held between the stopping member 145 and the retaining block 148. In this embodiment, because the elastic members 13 are located between the retaining blocks 148 and the base 121, one side of the base 121 is actually resisted by the elastic members 13<?>. The stopping member 145 is U-shaped in this embodiment, and has a hole 146 defined between the supporting boards 147 and the stopping member 145. Referring to FIG. 5, the latches 1213 of the follower 12 pass through the stopping member 145 by the hole 146, to latch with housing 15.

The cover 14 further has two securing members 149 protruding spacedly from one end thereof. The securing members 149 are configured to mount the shaft 16 to the cover 14.

Referring to FIGS. 1 and 5, the housing 15 has a compartment 151 recessed therein for holding, for example, a battery (not shown). The compartment 151 is enclosed by a bottom wall 1511 and a peripheral wall 1513 protruding from the bottom wall 1511. The housing 15 has a plurality of catches 1515 protruding from an inner surface of the peripheral wall 1513. The catches 1515 are for latching with the latches 1213 of the follower 12 when the cover 14 is in the closed position shown in FIG. 5 thereby preventing the cover 14 and the housing 15 from separating. Each catch 1515 has a sloped surface 1517 sloped on a distal end thereof, for facilitating the latches 1213 to latch with the catches 1515. The housing 15 further has a groove 153 defined transversely and communicating with the compartment 151. The groove 153 is configured to accommodate the shaft 16 therein.

Figure 4:
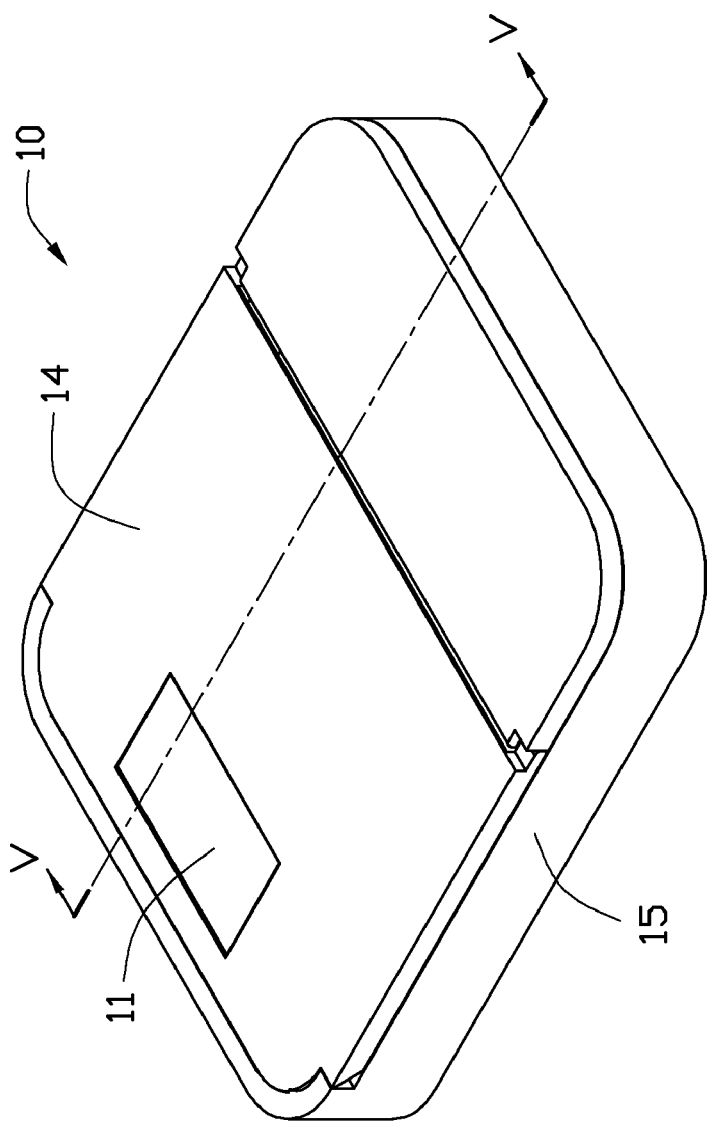
FIG. 4 is an assembled view of the portable electronic device in FIG. 1.

Referring to FIGS. 3 to 5, in assembly, one end of each elastic member 13 is first wrapped on one of the corresponding poles 1481 of the retaining blocks 148. The other end of each elastic member 13 is then wrapped on one of the posts 1215 of the follower 12 such that each elastic member 13 is coupled between the follower 12 and the cover 14. The notches 1211 of the follower 12 are aligned with the limiting portions 1431 of the limiting blocks 143, and then the follower 12 is pushed toward the cover 14, until the limiting portions 1431 pass through the notches 1211. During this motion, the elastic members 13 push the follower toward the catches 1515 of the housing 15. Then, two ends of the base 121 of the follower 12 are limited between the limiting blocks 143; two opposite surfaces of the base 121 is held between the supporting boards 147 and limiting portions 1431; the engaging portions 123 resists the cover 14 to assist the supporting boards 147 in supporting the base 121; two opposite sides of the base 121 is held between the stopping member 145 and the retaining block 148, the latches 1213 of the follower 12 pass through the stopping member 145 via the hole 146. The button 11 is then accommodated in the receptacle 141 of the cover 14. At this time, the joints 1133 of the button 11 are rotatably positioned in the voids 1433 correspondingly, the mating portion 1411 of the cover 14 is located in the resisting slot 1111 of the button 11, the resisting portions 1131 of the button 11 resist the engaging portions 123 of the follower 12. The shaft 16 is then held (e.g. hot-melted) between the securing members 149 of the cover 14. The cover 14 is then latched to the housing 15 in such a manner that the shaft 16 is received in the groove 153 of the housing 15. Then the cover 14 is pushed toward the housing 15. As the cover 14 moves, the latches 1213 of follower 12 are slid along the sloped surface 1517 of the catches 1515. With this motion, the elastic members 13 are compressed to accumulate force. When the latches 1213 cross through the catches 1515, the latches 1213 will move toward the catches 1515 under the force of the elastic members 13. Thus, the cover 14 is latched to the housing 15 by the latching engagement of the latches 1213 and the catches 1515.

Figure 6:
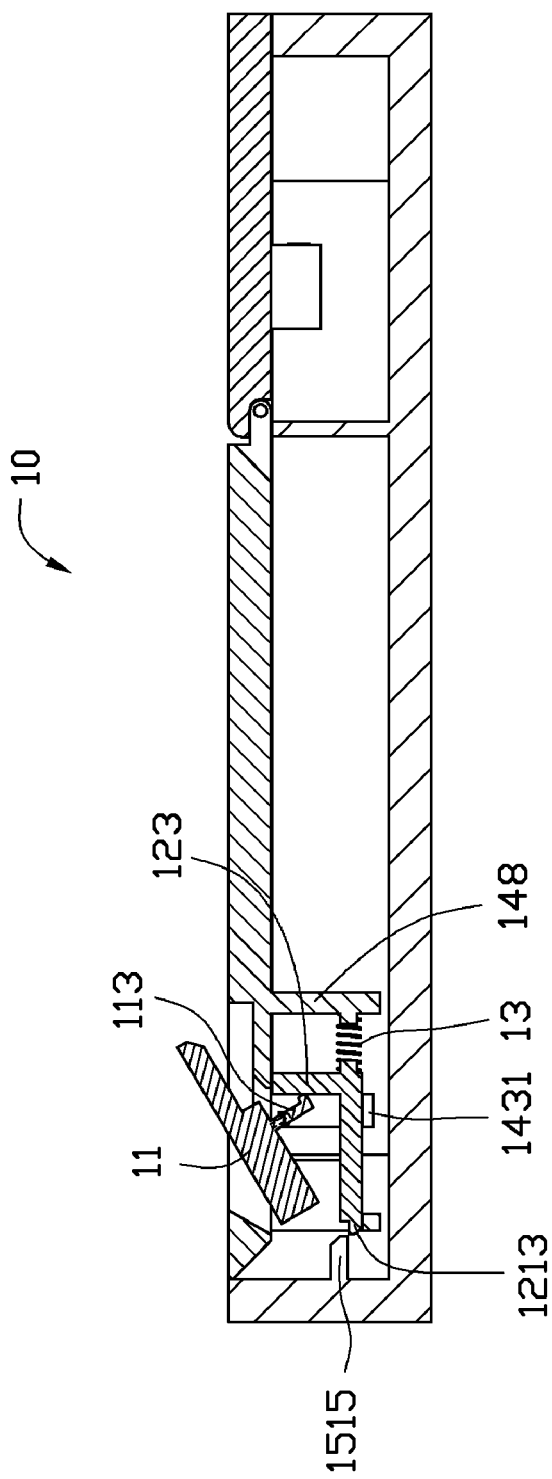
FIG. 6 is a cross-sectional view of the portable electronic device shown, but the cover is unlatched.

Referring to FIGS. 5 and 6, in use, the button 11 is rotated about the joints 1133 relative to the cover 14 by an external force such that the resisting portions 1131 of the button 11 are moved toward the engaging portions 123 to push the follower 12 toward the retaining blocks 148 of the cover 14. At this time, the elastic members 13 are compressed to accumulate force, and the latches 1213 of the follower 12 are moved away from the catches 1515 of the housing 15. The button 11 is rotated until the latches 1213 of the follower 12 and the catches 1515 of the housing 15 are unlatched. Then the cover 14 can be removed from the housing 15.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latching mechanism, comprising:
a housing having a catch disposed thereon;
a cover releasably mounted to the housing;
a button rotatably mounted to the cover;
a follower slidably mounted to the cover, and elastically resisted between the button and the cover, the follower having a latch releasably latched with the catch; and
wherein when the button is rotated relative to the cover, the button pushes the follower away from the catch to release the latch.

2. The battery cover latching structure as claimed in claim 1, wherein an elastic member is coupled between the follower and the cover, the elastic member biasing the follower to move toward the catch such that the latch of the follower is latched with the catch.

3. The battery cover latching structure as claimed in claim 2, wherein the button includes a main body and a resisting block protruded from an inner surface of the main body; when the button rotates relative to the cover, the resisting block push the follower.

4. The battery cover latching structure as claimed in claim 3, wherein the main body includes a resisting slot recessed from the inner surface thereof; when the cover is in a closed position, the resisting slot mates with the cover, thereby preventing the movement of the button toward the cover.

5. The battery cover latching structure as claimed in claim 3, wherein each resisting block has a resisting portion distal therefrom for pushing the follower when the button is rotated relative to the cover.

6. The battery cover latching structure as claimed in claim 5, wherein the follower includes a base and an engaging portion protruding from the base; the latch is positioned on one edge of the base; the engaging portion corresponds to and resist against the resisting portion of the button.

7. The battery cover latching structure as claimed in claim 6, wherein the base has a post positioned on another edge thereof opposite to the latch, the posts configured to wrap the elastic members thereon.

8. The battery cover latching structure as claimed in claim 3, wherein the button further includes two joints located thereon, the cover has two voids defined therein corresponding to the two joints; the joints rotatably mounted to the voids such that the button can rotate relative to the cover.

9. The battery cover latching structure as claimed in claim 1, wherein the cover has a receptacle defined therethrough corresponding to the button; the receptacle accommodates the button.

10. The battery cover latching structure as claimed in claim 9, wherein the cover has a mounting portion for slidably mounting the follower on the cover.

11. The battery cover latching structure as claimed in claim 10, wherein the mounting portion includes two limiting blocks located near two ends of the receptacle, two supporting boards positioned respectively near the limiting blocks, a stopping member connecting the supporting boards and located one side of the receptacle, and a retaining block located another side of the receptacle opposite to the stopping member; each limiting block has a limiting portion distal therefrom; the two ends of the follower are limited between the limiting blocks, two opposite surfaces of the base are held between the supporting boards and limiting portions; two opposite sides of the base are held between the stopping member and the retaining block.

12. The battery cover latching structure as claimed in claim 10, wherein the elastic member is resisted between the follower and the retaining block.

13. The battery cover latching structure as claimed in claim 10, wherein a hole is defined between the supporting boards and the stopping member, the latch of the follower can pass through the hole to latch with the catch.

14. A battery cover latching mechanism, comprising:
a housing having at least one catch positioned thereon;
a cover releasably mounted to housing;
a latching assembly having at least one latch releasable engaging with the catch of the housing, the latching assembly being rotatably and slidably mounted to the cover such that the rotation of the latching assembly relative to the cover causes the latching assembly to slide relative to the cover away from the catch to release the latch from the catch.

15. The battery cover latching structure as claimed in claim 14, wherein a latching assembly includes a button rotatably mounted to the cover and a follower slidably mounted to cover, the at least one latch protrudes from one edge of the follower.

16. The battery cover latching structure as claimed in claim 15, wherein the latching assembly further comprises a biasing member resisted between the cover and the follower to make the at least one latch elastically engaging with the at least one catch.

17. A portable electronic device, comprising:
a housing having a catch positioned thereon;
a cover mounted to housing;
a button rotatably mounted to the cover;
a follower slidably mounted to the cover, the follower having a latch releasably latched with the catch; and
wherein when the button is rotated relative to the cover, the button pushes the follower away from the catch to release the latch.

18. The portable electronic device as claimed in claim 17, an elastic member coupled between the follower and the cover, the elastic member biasing the follower to move toward the catch such that the latch of the follower is latched with the catch.

19. The portable electronic device as claimed in claim 18, wherein the button includes a main body and a resisting block positioned on an inner surface of the main body; when the button rotates relative to the cover, the resisting block pushes the follower.

20. The portable electronic device as claimed in claim 19, wherein the main body includes a resisting slot recessed the inner surface thereof; when the cover is in a closed position, the resisting slot mates with the cover, thereby preventing the movement of the button toward the cover.

* * * * *